Figure 1:
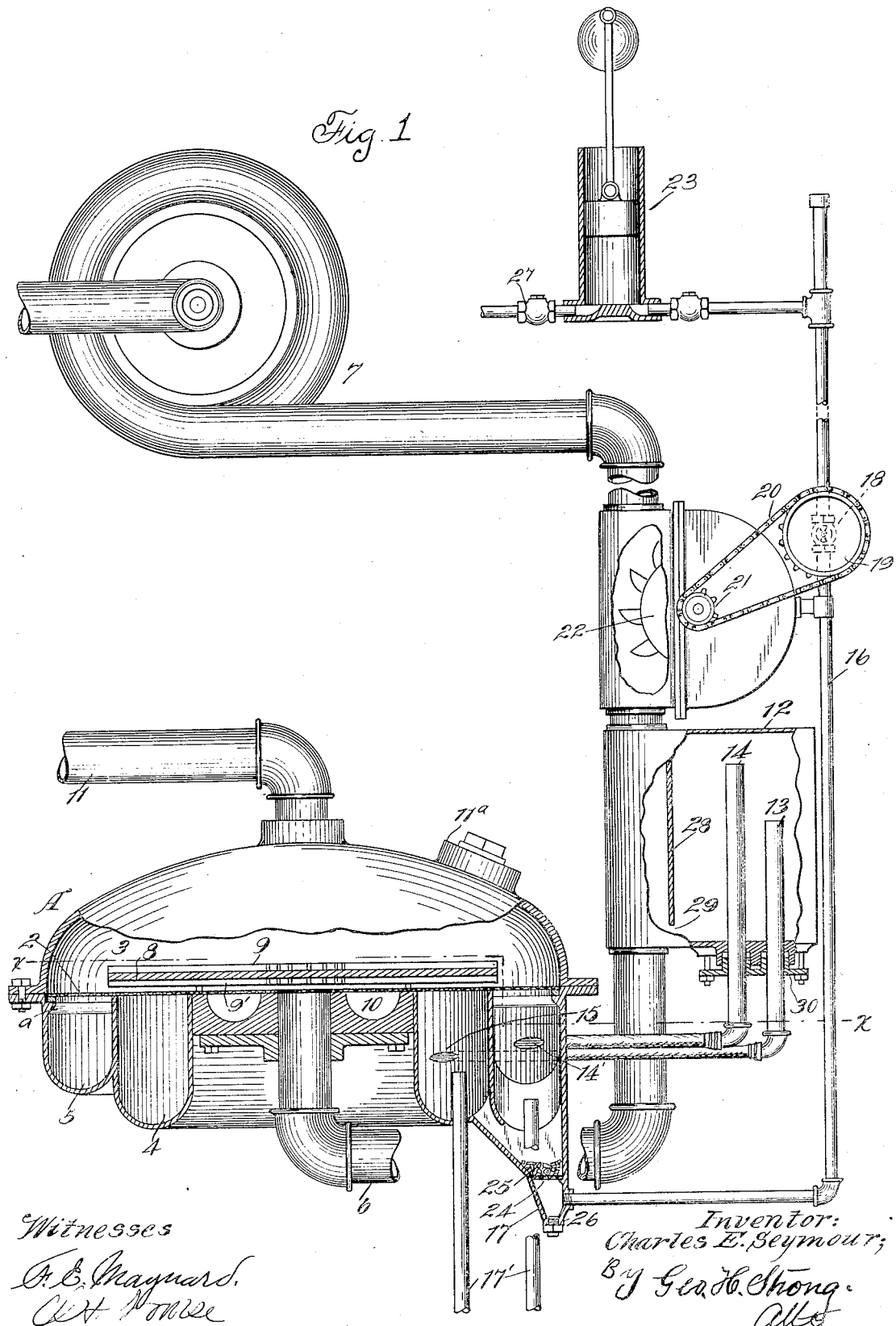

No. 896,471. PATENTED AUG. 18, 1908.
C. E. SEYMOUR.
HYDRAULIC SEPARATOR AND CLASSIFIER.
APPLICATION FILED AUG. 15, 1907.

2 SHEETS—SHEET 1.

Witnesses
F. E. Maynard.
C. H. Powse

Inventor:
Charles E. Seymour;
By Geo. H. Strong.
Atty

No. 896,471. PATENTED AUG. 18, 1908.
C. E. SEYMOUR.
HYDRAULIC SEPARATOR AND CLASSIFIER.
APPLICATION FILED AUG. 15, 1907.

2 SHEETS—SHEET 2.

Witnesses:

Inventor:
Charles E. Seymour,
By Geo. H. Strong,
Atty.

UNITED STATES PATENT OFFICE.

CHARLES E. SEYMOUR, OF PLACERVILLE, CALIFORNIA, ASSIGNOR OF ONE-FOURTH TO LAWRENCE E. KING, OF RENO, NEVADA.

HYDRAULIC SEPARATOR AND CLASSIFIER.

No. 896,471.     Specification of Letters Patent.     Patented Aug. 18, 1908.

Application filed August 15, 1907. Serial No. 388,719.

*To all whom it may concern:*

Be it known that I, CHARLES E. SEYMOUR, citizen of the United States, residing at Placerville, in the county of El Dorado and State of California, have invented new and useful Improvements in Hydraulic Separators and Classifiers, of which the following is a specification.

My invention relates to the art of recovering metals and minerals in a finely divided state, and is more particularly designed for the recovery of the values in finely comminuted condition contained in the river and beach sands. These sands carry gold, platinum, and other associated valuable minerals, and it is my purpose to recover them in a very concentrated product at a minimum cost.

My invention is also adapted to the recovery and concentration of the valuable minerals and metals from the pulp from quartz mills, as well as from the tailings from such mills.

In using my invention in connection with the modern dredgers, both of the suction or centrifugal pump type, and the bucket dredge, which often handle, and have a capacity of, several thousand yards per day, I have invented a device and process to admit of the classification of the material before entering the machine, herein described, so that only that part of the whole product that carries the valuable minerals and metals in a semi-concentrated product goes through the machine herein described.

The main characteristics of the present invention are a sizing or segregating chamber delivering sized grades of sand or pulp; pipe conduits leading from the segregating chamber to the separating chambers of the machine, which machine has its lower and upper chambers divided or separated by a screen or screens of desired mesh, through which the fine mineral and metal particles fall into the lower or supplemental screen-covered chambers; a deflector in the upper chamber that gives the material being treated a whirling or rotary action over the surface of the screens, which action allows the mineral to pass through and enter the supplemental chambers below the screen; the conduits from the sizer chamber conveying the fine slimes and water entering the supplemental chambers on a tangential line, or on a line to cause the material in the supplemental chambers to rotate around the inside of the supplemental chambers, causing a separation in said supplemental chambers by centrifugal force; the skimming discharge tubes or openings on the inside radius of the supplemental chambers to skim off the lighter and non-mineral portion of the contents; the discharge hopper through which water under pressure is pulsated by proper mechanism to drive back into the supplemental chambers any of the lighter or non-mineral or metallic particles that may have entered this discharge hopper, and allowing the minerals to discharge through the pressure of the pulsating water to the outside; a pulp driven wheel to operate the pulsating mechanism, and a pump to be used where natural pressure is not available; a centrifugal sand pump, and screens and riffles which can be changed to suit the conditions, and be so regulated as to save precious stones of a greater specific gravity than the ordinary gangue.

With the above named primary objects, and means for accomplishing those objects, and other incidental objects in view, the invention more particularly consists of the devices and parts, or the equivalents thereof, as hereinafter more completely set forth.

Figure 3:
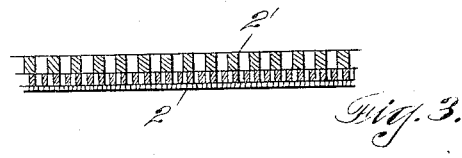
Figure 1:
Figure 2:
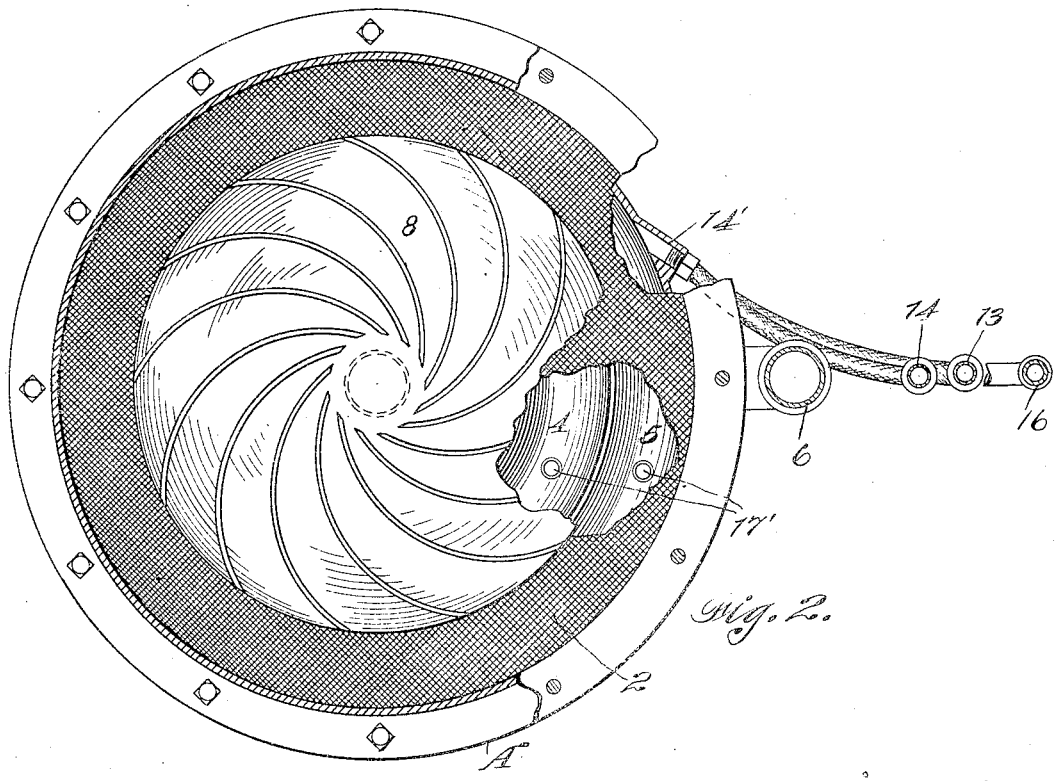

Figure 1 is an elevation in partial section of my apparatus. Fig. 2 is a plan view on line X—X, Fig. 1, with parts broken away to show supplemental chambers. Figs. 3 and 4 are sectional views showing suitable screen constructions.

A is an inclosed stationary receptacle or casing of suitable size, shape and material, divided transversely by the screen or foraminous diaphragm 2 into an upper main separating chamber 3, and the lower supplemental separating and classifying chambers 4—5.

6 is a feed-pipe receiving the material to be treated under pressure from the pump 7, or other suitable source, and delivering it up centrally through the casing A and screen 2 against a deflector 8. The latter has the spirally-arranged lower and upper veins or riffles 9—9', whereby centrifugal motion is imparted to the material, and water in which the material is carried in suspension.

10 is an annular amalgam pocket below screen 2.

11 is the outlet for the waste material and water from chamber 3.

12 is a sizing chamber interposed in the feed-pipe or column 6.

13—14 are pipes terminating at different levels in the sizing chamber. One pipe, as 13, discharges into the supplemental chamber 4, at 15, and the other discharges into the supplemental chamber 5, at 14'; the discharge in each instance being on a line as nearly as practical with a radius of the supplemental chamber, or oblique thereto, for the purpose of causing the contents of those chambers to move in a circular motion and produce a centrifugal separation of the material; the fine mineral and metallic particles of greatest specific gravity arranging themselves on the outer wall of the chambers. The lighter and waste products pass off through the vertical skimming tubes 17' which are disposed just behind the nozzles 14'—15.

16 is a pressure-pipe connected with any suitable source of water supply under pressure and connecting with the discharge hopper 17, arranged beneath and connected with the supplemental annular chambers 4—5. A wing-valve 18 is arranged in the pipe 16, and is operated by suitable means to intermittently cut off the flow through pipe 16 and cause a pulsating effect in the trap and chambers 4—5. As shown, the stem of valve 18 carries a sprocket-wheel 19, which connects by a chain 20 with a sprocket-wheel 21 on the shaft of an incased water-wheel 22, which latter is driven by the pressure and flow of the fluid in feed-pipe 6. Flow under pressure in pipe 16 may be produced by any suitable means, as the pump 23.

In hopper 17 is a screen or false bottom 24, on which is deposited a bedding 25 of some suitable granular material, like iron, copper, shot, or other metal, through which the water from pipe 16 pulsates to cause a jigging and separating action to take place in the chambers 4—5. The heavier particles of materials which pass through the diaphragm-screen 2 collect in the mineral discharge hopper 17, passing through the bedding 25 and screen 24 to the outlet 26. It is understood that the upward, counter, pulsating current through the trap is just sufficient to cause the necessary jigging and separating action, and is not strong enough to disturb the downward travel and collection of the values in the desired manner.

The flow of water through pipe 16 may be regulated by a valve 27. Where water under pressure is not available, I provide the pump 23 to produce the pulsation. Any form of pump may be used for this function, and I do not herein claim any particular specific type. The column of pulp that enters the sizing chamber 12 will discharge its heavier sands and mineral straight through and into the machine, but the lighter particles, with the water accompanying them, will rise in the sizing chamber next the pipes 13—14 and discharge into said pipes, and into the supplemental chambers 4—5, producing the circular and centrifugal action hereinbefore described. The dam or vertical partition 28 in the chamber 12 closes out the side from which the pipes 13—14 take their supply, except for a small opening or slot 29 at the bottom of the dam. It will be obvious, therefore, that any product entering the pipes 13—14 must pass through the aperture 29 at the lower end of the dam 28 and rise to the intake end of the pipes 13—14, making it possible to get into, and through, the said pipes 13—14, a coarser or finer grade of product, as may be desired. By adjusting the pipes 13—14 through the stuffing-box 30, so that their intake end is lower and closer to the opening in the dam 28, one will get a coarser product; adjusting the intake end nearer the top of the chamber, one will get only the finer products. This makes it possible to force into the supplemental chambers 4—5 any grade in fineness of product desired, and of any given size. As here shown, the pipes have their intakes at different levels, so that each delivers a different grade of material in suspension into their respective chambers 4—5.

The pulp or material that passes down through the column 6 is discharged radially and spirally by the vanes 9 over the screen 2, which latter covers the whole area of the lower half of the chamber 3, except at the discharge point of pipe 6. This screen acts as a continuous riffle to arrest any mineral particles; those that are fine enough to pass through, dropping into the supplemental chambers for further separation and discharge. The deflector plate and blades 9 distribute the pulp over the screen and produce a centrifugal force within the upper chamber, which force acts to throw any larger particles of mineral that have entered the chamber, outward toward the outer walls of the chamber; the lighter particles, or tailings, being forced toward the center by displacement, and discharged through the discharge pipe 11, as waste material.

Where a pressure of sufficient force exists, by proper fall, to cause sufficient velocity of the pulp within the machine, the pump 7 need not be used; these conditions often exist in quartz mills and elsewhere. In working river or beach mineral-bearing sands, either a centrifugal pump or its equivalent must be used to raise and force the mineral-bearing sands through the machine at the proper velocity.

It will be obvious to one familiar with the art, and with hydraulics, that the water forced into the supplemental chambers 4—5 through the pipe 16 and the discharge hopper 24 will transmit its pulsating actions through the screen partition 2 forming the supplemental chambers 4—5 and produce a separating action on the screen and in the upper chamber; these pulsations keeping the screen clear and allowing the particles of greatest specific gravity to pass through the screen and into the supplemental chambers, where they are further separated into a finished product, centrifugally; and by skimming away through the tubes 17' the lighter gangue or waste, thereby allowing a separation to be completed in the supplemental chambers until a sufficiently clean and desirable product can, by proper adjustment, be discharged and recovered continuously. It will be seen in Fig. 1 that two tailing discharge openings 11 and 11ª are provided, and in many cases it may be desirable to have more, where material is being treated that is very coarse and rocky, making it possible to discharge the refuse or tailings nearer the outer radius of the upper chamber. This, however, is a detail, and openings may be numerous, being closed by plugs when not in use.

The pump 7 may be of any dredge type, and may be provided preferably with adjustable wearing parts; I do not wish to claim any specific type, but I do claim broadly the use of my separating machine in conjunction with them all.

Figs. 3 and 4 represent, in section, nests of screens and riffle bars in connection with the screen 2, and these nests are preferably made of graduating screens; that is, a fine one at the bottom, next above a medium, and so on up, increasing in size of mesh; and as heretofore stated, riffle bars 2' may be used on top of the screens, if desirable, to more fully arrest and hold any precious stones, or coarse semi-freed or freed mineral or metallic particles. It will be seen that the receptacle A is made in two halves, provided with suitable packing in the joint, and bolted together with the screen between the two halves, and said screen having a seating in the flanges a, all being held together by bolts, any desired number of which can be used.

The operation of my invention is as follows: The mineral-bearing material is pumped or allowed to flow under pressure into the column pipe 6 above, or beyond, the sizing chamber 12, and wheel chamber 22'. All of the coarser material will pass down through the sizing chamber 12 and up into the upper machine chamber 3, coming into contact with the deflector plate 8, which by its curved arms or vanes 9 distributes the material over the screen floor, allowing the finer mineral particles to pass through the screen and into the supplemental circular chambers 4 and 5, where the separation of the mineral and metallic particles is completed by centrifugal force and discharged against and through an adverse or counter current of water under pressure, and a pulsating action produced by the valve gate, and mechanism, or by the pump 23. The deflector blades 9' on top of plate 8 also produce a centrifugal force, or a whirling rotary motion of the material in chamber 3, so that the material therein which is of the greatest specific gravity will be held in the chamber; that is to say, the values which will not pass through the screen into the supplemental chambers will be recovered in the upper or initial chamber. All of the flow of waste material, that is non-mineral or non-metallic, will pass off through the discharge pipe 11; or, as the case may be, through the opening at 11ª in which the pipe 11 can be placed, and plugging the center hole where pipe 11 is now joined. The intake ends of the pipes 13—14 receive only the fine and lighter particles called slimes, some of which are finely divided mineral particles that would, if allowed to enter the main or upper chamber, pass through the screen into the supplemental chamber; but the action in the upper chamber being so much more violent than in the lower chamber, a somewhat greater recovery is obtained by separating the fines or slimes and conducting them to the supplemental chambers, where the separating action is completed. By this process of cutting out the fines and conducting them into the supplemental chambers 4 and 5 at 14' and 15, approximately on a line of a radius of the chambers, or oblique thereto, the centrifugal and separating force is produced by the discharge of the material, slimes and water, under pressure into the supplemental chambers, which causes the particles of greatest specific gravity to get to the outside of the circular channel supplemental chambers so that only the gangue or waste is skimmed off through the pipes 17', thus holding the mineral and metallic particles within the said chambers to be discharged at the discharge hopper 24 and recovered as a finished product.

I prefer to place the skimming tubes 17 as near to the discharge hopper as possible, or as far around in the line of flow, and from the openings 14'—15, for the purpose of giving all the latitude possible for a separation before the material reaches the skimming tubes 17. The preferred position of the skimmers is shown in Fig. 2, but they may be placed at any desired point in the radius, and may project into the chambers to any desired distance; also, they may be of any desired size suited to the material being treated. The tubes or conduits which connect with pipes 13—14 and nozzles 14'—15 are preferably of hose to admit of an adjustment freely of the intake pipes 13—14 up and down to give the most desirable product for the supplemental chamber separation.

In Fig. 2 I have shown the screen 2 only in part, but I desire to make a complete separation of the upper chamber and lower supplemental chambers by the said screen, and the only opening through said screens is at the center, and for the discharge of the material through the pipe 6 against the deflector plate 8 and over the screen or riffles. It will also be obvious to one familiar with the art that the material to be treated can be forced into the machine by a hydraulic or pneumatic elevator or "jet" or by a combination of both, as an equivalent of either a centrifugal pump, a bucket dredge, or any other system that admits of the material to be treated being conducted to the machine for separation and discharged under continuous pressure. It will be readily seen that it will be possible to dispense with the sizing chamber 12 with its conduits 13—14, and to admit to the supplemental chambers, to cause the centrifugal force, water or fluid under pressure, continuous or intermittent, without departing from the fundamental principle of my invention. I prefer, however, to use the sizing of the pulp feature, but could and do desire to use water under separate pressure to operate my invention. I have invented this sizing, separating and classifying jig with a view to a continuous separation, more particularly of the mineral and metallic values from the sands being pumped from the rivers of the Pacific slope and elsewhere, and to provide means whereby this recovery can be made, and tailings, or waste, or barren detritus, can be carried off through the pipe 11 to any tract that is being reclaimed, or the mineral-bearing sands can be carried through the pipes from the pump through the apparatus, and onto the dump at any desired point distant.

It is possible that various changes and modifications may be made in the herein described apparatus, without departing from the principle of the invention.

Having thus described my invention, what I claim and desire to secure by Letters Patent is—

1. A classifying apparatus having in combination a separating chamber in which the operation is carried on, a feed-pipe leading to said chamber to convey the material to be treated under continuous pressure, said apparatus having a supplemental classifying chamber below the separating chamber, a screen dividing said chambers, said apparatus having a hydraulic sizing chamber connected with said feed-pipe, and said sizing chamber having a discharge conduit leading therefrom and discharging tangentially into said supplemental chamber, whereby there is produced a rotating motion of the contents of said chamber.

2. A classifying apparatus having in combination a main separating chamber, screens forming the floor of said chamber and through which the fine mineral and metallic particles pass, said apparatus having supplemental chambers below the main separating chamber and connected therewith through the screen, said supplemental chambers adapted to receive and further separate and classify the mineral and metallic particles passing through said screens, means for creating centrifugal motion in said supplemental chambers to effect the separation and classification therein, and a feed-pipe connecting with the main screen-floored chamber and conveying thereto the coarse sands to be treated under pressure.

3. A classifying apparatus having in combination a main separating chamber, screens forming the floor of said chamber and through which the fine mineral and metallic particles pass, said apparatus having supplemental chambers below the main separating chamber and connected therewith through the screen, said supplemental chambers adapted to receive and further separate and classify the mineral and metallic particles passing through said screens, means for creating centrifugal motion in said supplemental chambers to effect the separation and classification therein, and a feed-pipe connecting with the main screen-floored chamber and conveying thereto the coarse sands to be treated under pressure, said supplemental chambers having a centripetal discharge for the waste material, and a centrifugal discharge for the valuable products.

4. In a classifying or separating jig, the combination with a separating receptacle, of screens within the said receptacle, which screens form the separation between the main and the supplemental chambers, a feed-pipe leading into the upper chamber over the said screens, a deflector within the upper chamber, and means provided by the deflector to create a circular and distributing movement of the material over the top of the screens, said screens having means acting as riffles, to arrest and allow to discharge through, and into the supplemental chamber, any mineral or metallic particles that can pass the screens.

5. A classifying apparatus having in combination a main separating chamber, screens forming the floor of said chamber and through which the fine mineral and metallic particles pass, said apparatus having supplemental chambers below and separated from the separating chamber by said screens, said supplemental chambers adapted to receive and further separate and classify the mineral and metallic particles passing through said screens, means for creating centrifugal motion in said supplemental chambers to effect the separation and classification therein, a feed-pipe connecting with the main screen-floored chamber and conveying thereto the coarse sands to be treated under pressure, said supplemental chambers having a centripetal discharge for the lighter material and a centrifugal discharge for the heavier products, a foraminous partition in said centrifugal-mineral-discharge, and means for creating a pulsating movement through said foraminous partition.

6. In a classifying separating jig, the combination of upper and lower screen-separated receptacles, a deflector in the upper chamber having means to give the pulp or sand a rotary, whirling and distributing motion, and pipes leading to the lower or supplemental chambers adapted to so discharge fine pulp, slimes or water into the supplemental chambers as to produce a rotary motion of the product therein, to cause the particles of mineral and metal to be separated by centrifugal force.

7. In a separating jig, the combination with a treatment receptacle having screen-covered lower supplemental chambers, of pipes connecting with said chambers and delivering thereinto tangentially fluid under pressure to produce centrifugal separating action on the material being treated, means for delivering material into said chambers and through the screen coverings thereof under pressure, and a discharge hopper connecting with the supplemental chambers, said chambers having centripetally located discharge openings for the lighter material, and having centrifugal discharge openings for the heavier material communicating with said hopper.

8. In a separating jig, the combination with a treatment receptacle having screen-covered lower supplemental chambers, of pipes connecting with said chambers and delivering thereinto tangentially fluid under pressure to produce centrifugal separating action on the material being treated, means for delivering material into said chambers and through the screen coverings thereof under pressure, a discharge hopper connecting with the supplemental chambers, said chambers having centripetally located discharge openings for the lighter material, and having centrifugal discharge openings for the heavier material, said openings communicating with said hopper, said hopper having a foraminous diaphragm, and means for creating a pulsating movement through said diaphragm to the contents of the chambers.

9. In a classifying apparatus, the combination of a substantially closed receptacle, screens within the receptacle that divide the latter into upper and lower chambers, a feed-pipe leading into the upper chamber of the receptacle, a discharge pipe for tailings leading therefrom, a stationary deflector for giving centrifugal motion to the material in the upper chamber, means for delivering the material through said feed-pipe under pressure, said feed-pipe having in its length a hydraulic sizing chamber, and fluid connections between said sizing chamber and the said lower chambers, said fluid connections arranged to carry to said lower chambers material in different degrees of fineness, and said fluid connections discharging approximately tangentially within said lower chambers to produce centrifugal motion on the contents of the chambers.

10. In a classifying apparatus, the combination of a substantially closed receptacle, screens within the receptacle that divide the latter into upper and lower chambers, a feed-pipe leading into the upper chamber of the receptacle, a discharge pipe for tailings leading therefrom, a stationary deflector for giving centrifugal motion to the material in the upper chamber, means for delivering the material through said feed-pipe under pressure, said feed-pipe having in its length a hydraulic sizing chamber, and fluid connections between said sizing chamber and the said lower chambers, said fluid connections arranged to carry to said lower chambers material in different degrees of fineness, and said fluid connections discharging approximately tangentially within said lower chambers to produce centrifugal motion on the contents of the chambers, said lower chambers having separate discharges for the waste material and mineral, said waste material discharges being arranged nearer the center of said chambers.

11. In a hydraulic separator and classifier, the combination of inclosing means for an upper chamber and lower supplemental chambers, a screen dividing the upper chamber from the lower supplemental chambers, a pulp feed-pipe entering the upper chamber, means for delivering the material to be treated through said feed-pipe under pressure, supplemental feed-pipes connecting said first-named feed-pipe and said supplemental chambers, and discharging thereinto approximately tangentially to the chambers to produce centrifugal motion therein, and means whereby said supplemental feed-pipes deliver material of different degrees of fineness into said chambers.

12. In an ore separating and classifying machine, the combination with an ore-receiving receptacle having a plurality of chambers, of a screen forming part of said chambers, ore feed-pipes connecting with said chambers, means for conducting the material to be treated through said pipes to the respective chambers under continuous pressure, means for creating centrifugal motion in said chambers, a sizing chamber with which the feed-pipes for certain of said chambers connect, and means whereby said sizing chamber delivers through said pipes to the different chambers, pulp of different degrees of fineness.

13. In an ore separator and classifier, the combination of a receptacle, a feed-pipe and means by which the pulverized ores are conducted under continuous pressure through the receptacle, means in the receptacle for effecting a separation of the values and waste, said means including a screen dividing the receptacle into upper and lower chambers and fixed spiral blades on top of the screen, jet-pipes leading into the underneath chambers to create centrifugal motion therein, a sizing chamber in the feed-pipe said jet-pipes connected with said sizing chamber in the feed-pipe, said jet-pipes being relatively adjustable to permit pulp of different degrees of fineness to pass therethrough, and said underneath chambers having a centrifugally acting mineral discharge and a centripetally acting waste discharge.

14. In an ore separator and classifier, the combination of a receptacle, a feed-pipe and means by which the pulverized ores are conducted under continuous pressure through the receptacle, means in the receptacle for effecting a separation of the values and waste, said means including a screen dividing the receptacle into upper and lower chambers and fixed spiral blades on top of the screen, jet-pipes leading into the underneath chambers to create centrifugal motion therein, a sizing chamber in the feed-pipe, said jet-pipes connected with said sizing chamber in the feed-pipe, said jet-pipes being relatively adjustable to permit pulp of different degrees of fineness to pass therethrough, said underneath chambers having a centrifugally acting mineral discharge and a centripetally acting waste discharge, and said waste discharge being located in line with the flow of the contents of said lower chambers contiguous to the centrifugal mineral discharge.

15. In a machine of the character described, a separating receptacle having separating chambers, a feed-pipe connecting the main separating chamber with a pressure device, said feed-pipe having a sizing chamber, and said sizing chamber having a plurality of discharge pipes connecting with the other separating chambers in the receptacle, said discharge pipes being relatively adjustable to deliver pulp of different degrees of fineness, said discharge pipes entering respective of said separating chambers to create centrifugal motion therein, and said chambers having separate discharges for waste and mineral.

16. A classifying apparatus inclosing upper and lower chambers, a screen separating horizontally said chambers, through which screen the fine mineral and metallic particles that enter the upper chamber pass into the lower chamber, a feed-pipe, and pressure means for delivering material to be treated into the upper chamber, said feed-pipe having by-pass connections with the lower chamber, said by-pass connections arranged to create centrifugal motion in the lower chamber.

17. A classifying apparatus inclosing upper and lower chambers, a screen separating horizontally said chambers, through which screen the fine mineral and metallic particles that enter the upper chamber pass into the lower chamber, a feed - pipe and pressure means for delivering material to be treated into the upper chamber, said feed-pipe having by-pass connections with the lower chamber, said by-pass connections arranged to create centrifugal motion in the lower chamber, said lower chamber having separate discharges for the waste products and the mineral, and a pulsating mechanism operating in the discharge passage for the mineral.

18. In a machine, as, and for the purpose described, the combination with a treatment receptacle of upper and lower chambers within the said receptacle, a screen, said chambers being formed in part by said screen, said screen admitting the passage of fine material or fluid therethrough from the upper to the lower chambers, and, vice versa, back to the upper chamber, thereby equalizing the pressure in the chambers, and pipes leading to the lower or supplemental chambers, said pipes being so connected with the said chambers that the discharge through said conduits into the said chambers, of the material and water, produces a circular motion of the material within said chambers for the purpose of assisting the separation of the material being treated by centrifugal action.

19. In a separating machine, a receptacle inclosing a main separating screen-bottomed chamber, supplemental chambers connecting with said main chamber, feed and discharge pipes leading to and from said supplemental chambers, a sizing chamber, discharge pipes leading from said sizing chamber and designed to conduct the material to be treated therethrough into the supplemental chambers, pulsating mechanism, and conduits connecting with said chambers and said pulsating mechanism, whereby an intermittent or pulsating flow enters the chambers.

20. In a jig separator, the combination with a treatment receptacle of annular supplemental channels in the lower portion of said receptacle, feed - pipes leading to said supplemental chambers at an angle in a horizontal plane with the intersecting radius, for the purpose of causing the material to travel around in said chambers, thereby producing a centrifugal and separating action, said chambers having waste discharge openings, a pulsating device, and a pipe connecting said chambers with said pulsating device, whereby the pulsating water passing through said pipes is given a pulsating or intermittent flow to the chambers.

21. In a separating device, the combination with a treatment receptacle of annular channels within the lower portion of the receptacle, feed-pipes for the material being treated, said receptacle and chambers having discharge openings for tailings and for the separated products, said feed-pipes adapted and located so that they discharge their contents into said supplemental chambers to cause the material being treated to take a revolving separating motion by the force of the discharging contents of said pipes of the material conducted into the chambers under pressure, and a feed forcing device connected with said receptacle.

22. In a separating jig, the combination with a treatment receptacle, said receptacle being divided into separate upper and lower chambers by screens, said screens adapted to classify the material being treated by the passage through said screens of the finer and semi-mineral and metallic products to the lower or supplemental chambers, of feed-pipes entering said supplemental chambers at an angle adapted to give the material therein a travel around in the chamber to produce a centrifugally separating action, means forming separate discharges for the mineral or metallic products of separation, and for the tailings or gangue, a pulsating device connected with said chambers by a conduit through which fluid may be forced under pressure into the said chambers and into the receptacle, and means for feeding the material to be treated into the treatment receptacle.

23. In a separating and classifying machine, the combination with a stationary main treatment receptacle of chambers divided off therein by screens, said receptacle and chambers having intake and discharge openings, a pulp column, said column designed to receive and conduct the pulp to the said receptacle and the said chambers, and through and away from the said receptacle and chambers, by the pressure of the fluid in said column, a pulsating device with conduit leading therefrom and to the chambers, which pulsating device and fluid therein cause within the chambers a pulsating action, to assist in the separation of the material, and means whereby the material being treated is given a revolving motion within the receptacle and its chambers.

24. In a separating device, the combination with an ore receiving receptacle, said receptacle being divided by screens into separate upper and lower chambers, said screens adapted to allow the finer particles of the material being treated to pass into the lower of the chambers, an impulse jet conductor connected with the lower chamber or chambers so that the fluid that is forced into the said chambers will act on the material contained therein and being treated by impulse, the water or fluid causing it to revolve around within the chamber, producing a centrifugal separating action on the material being treated, and a pressure feed column through which the material is delivered under pressure.

25. In a classifying, separating jig, the combination with a receptacle in which the operation is carried on, of separate upper and lower chambers within said receptacle, said chambers being connected through screens, which screens are adapted to hold the coarser material in the upper chamber of the receptacle, allowing the finer heavy material to pass the screens into the lower chambers, said chambers having discharge outlets for the waste matter, and said lower chambers having a discharge opening for the mineral and metallic product, said last-named opening connecting with a mineral discharge chamber, a pulsating device, and a connection from said device to said mineral discharge chamber, said connection being a conduit for fluid under pressure, whereby fluid can be conducted in a pulsating manner into the chambers.

26. In a separating or sizing jig, the combination with treatment chambers, of conduits leading to and from said chambers, fluid forcing devices connected with the feed conduits for the purpose of delivering the material into the said chambers under pressure, angle discharge jets leading to the said chamber, said angle jets designed to cause a revolving motion of the material being treated, a conduit connecting with said chambers and with a mechanism whereby a pulsating flow of fluid is forced into the chambers to assist the classifying separating action on the material being treated, and means whereby said pulsating mechanism is operated from the flow of material through the pipes.

27. In a separating or sizing jig, the combination with treatment chambers, of conduits leading to and from said chambers, fluid forcing devices connected with the feed conduits for the purpose of delivering the material into the said chambers under pressure, angle discharge jets leading to the said chamber, said angle jets designed to cause a revolving motion of the material being treated, a conduit connecting with said chambers and with a mechanism whereby a pulsating flow of fluid is forced into the chambers to assist the classifying separating action on the material being treated, and means whereby said pulsating mechanism is operated from the flow of material through the pipes, said last named means including a water-wheel in the feed conduit and a valve in the pulsating conduit.

28. In an apparatus of the character described, a casing divided horizontally by a foraminous diaphragm into an upper receiving chamber and a lower separating chamber, a feed-pipe delivering into the upper chamber, means, including spirally-arranged stationary plates, for giving a rotary motion to the material discharged into said chamber, and hydraulic means for giving a rotary motion to the material in the separating chamber.

29. In an apparatus of the character described, a casing divided horizontally by a foraminous diaphragm into an upper receiving chamber and a lower separating chamber, a feed-pipe delivering into the upper chamber, means, including spirally-arranged stationary plates, for giving a rotary motion to the material discharged into said chamber, hydraulic means for giving a rotary motion to the material in the separating chamber, said chambers having separate waste outlets, said separating chamber having an outlet for the values, and means for creating a pulsating counter current through said outlet for the values.

30. In an apparatus of the character described, a casing divided horizontally by a foraminous diaphragm into an upper receiving chamber and a lower separating chamber, a feed-pipe delivering into the upper chamber, means, including spirally-arranged stationary plates, for giving a rotary motion to the material discharged into said chamber, hydraulic means for giving a rotary motion to the material in the separating chamber, and means for creating a pulsating effect on the contents of the separating chamber.

31. In an apparatus of the character described, a casing divided horizontally by a foraminous diaphragm into an upper receiving chamber and a lower separating chamber, a feed-pipe delivering into the upper chamber, means, including spirally-arranged stationary plates, for giving a rotary motion to the material discharged into said chamber, hydraulic means for giving a rotary motion to the material in the separating chamber, a hopper in the bottom of said separating chamber for the collection of the values, and means for creating a pulsating effect through said hopper.

32. In an apparatus of the character described, a casing divided horizontally by a foraminous diaphragm into an upper receiving chamber and a lower separating chamber, a feed-pipe delivering into the upper chamber, means, including spirally-arranged stationary plates, for giving a rotary motion to the material discharged into said chamber, hydraulic means for giving a rotary motion to the material in the separating chamber, a hopper in the bottom of said separating chamber for the collection of the values, means for creating a pulsating effect through said hopper, and vertically-arranged skimming tubes in said separating chamber.

33. An apparatus of the character described, comprising a stationary closed vessel divided into upper and lower chambers, a foraminous partition capable of passing finely divided valuable matter separating the chambers, means for admitting into each chamber, from a common source of supply, water containing different grades of material, and means for imparting a rotary motion to the contents of the chambers to effect a separation through centrifugal force.

34. An apparatus of the character described, comprising a stationary closed vessel divided into upper and lower chambers, a foraminous partition capable of passing finely divided valuable matter separating the chambers, means for admitting into each chamber, from a common source of supply, water containing different grades of material, means for imparting a rotary motion to the contents of the chambers to effect a separation through centrifugal force, and means for imparting to the contents of the chambers a pulsating motion in addition to the rotary motion.

35. A classifying apparatus comprising in combination a receiving receptacle carrying screens therein, which screens divide the receptacle into upper and lower chambers, a feed-pipe entering the upper chamber above the screens, a distributer within the upper chamber, said distributer carrying curved blades, said chamber having an upward discharge above the deflector for the waste material, means for delivering material through the feed-pipe into said chamber under pressure, said lower chamber having a hydraulic classifying chamber receiving the mineral passing through said screens, and an impulse device operating in said classifying chamber.

In testimony whereof I have hereunto set my hand in presence of two subscribing witnesses.

CHARLES E. SEYMOUR.

Witnesses:
CHAS. E. MARSH,
GUY E. WENTWORTH.